United States Patent
Kim

(10) Patent No.: US 9,112,580 B2
(45) Date of Patent: Aug. 18, 2015

(54) MOBILE TERMINAL AND CONTROLLING METHOD THEREOF

(71) Applicant: LG ELECTRONICS INC., Seoul (KR)

(72) Inventor: Joonkie Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 13/851,806

(22) Filed: Mar. 27, 2013

(65) Prior Publication Data

US 2014/0045430 A1    Feb. 13, 2014

(30) Foreign Application Priority Data

Aug. 13, 2012    (KR) .................. 10-2012-0088431

(51) Int. Cl.
*H04B 7/00* (2006.01)
*H04B 7/26* (2006.01)
*H04M 1/725* (2006.01)

(52) U.S. Cl.
CPC .............. *H04B 7/26* (2013.01); *H04M 1/7253* (2013.01); *H04M 2250/02* (2013.01)

(58) Field of Classification Search
USPC ....................... 455/41.1, 41.2, 41.3
See application file for complete search history.

(56) References Cited

U.S. PATENT DOCUMENTS

| | | | |
|---|---|---|---|
| 7,711,388 B2 * | 5/2010 | Noda et al. | 455/550.1 |
| 2008/0280636 A1 | 11/2008 | Kim | |
| 2010/0227556 A1 * | 9/2010 | Kim et al. | 455/41.2 |
| 2011/0037712 A1 * | 2/2011 | Kim et al. | 345/173 |

FOREIGN PATENT DOCUMENTS

| | | | |
|---|---|---|---|
| EP | 1 416 703 A2 | 5/2004 | |
| GB | 2 360 914 A | 10/2001 | |

* cited by examiner

*Primary Examiner* — Nguyen Vo
(74) *Attorney, Agent, or Firm* — Birch, Stewart, Kolasch & Birch, LLP

(57) ABSTRACT

A mobile terminal including a display unit configured to display a Bluetooth setting menu for establishing a Bluetooth connection to a specific external device; a short range communication module configured to attempt to establish the Bluetooth connection to the specific external device; and a controller configured to receive an input request for attempting to establish the Bluetooth connection to the specific external device via the Bluetooth setting menu, control the short range communication module to search for the specific external device to attempt to establish the Bluetooth connection with the specific external device, and control the display unit to display indication information indicating a failure of the search for the specific external device if the search for the specific external device fails.

31 Claims, 13 Drawing Sheets

(a)

(b)

(a)

(b)

MOBILE TERMINAL AND CONTROLLING METHOD THEREOF

This application claims the benefit of earlier filing date and right of priority to Korean Application No. 10-2012-0088431, filed on Aug. 13, 2012, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals. In addition, the mobile terminals can be further classified into handheld terminals and vehicle mount terminals.

There are ongoing efforts to support and increase the functionality of mobile terminals. Such efforts include software and hardware improvements, as well as changes and improvements in the structural components which form the mobile terminal.

Currently, in order for a mobile terminal to connect a Bluetooth communication with an external device, the mobile terminal needs to search for the external device and pair the found external device. If 'allow my device search' is not set up in the external device, the mobile terminal can't connect the Bluetooth communication with the external device because the pairing failed with the external device.

However, because most of users are unaware that the external device can be found by the mobile terminal on the condition that 'allow my device search' is set up in the external device, a Bluetooth connection between the mobile terminal and the external device cannot be made.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a user is enabled to intuitively notice that an external device to be connected to the mobile terminal by Bluetooth has not been found.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a display unit configured to display a Bluetooth setting menu for a Bluetooth connection to a specific external device, a short range communication module configured for the Bluetooth connection to the specific external device, and a controller configured to control the short range communication to search the specific external device if the Bluetooth connection to the specific external device is requested via the Bluetooth setting menu, and to control the display unit to display an indication information indicating a failure of the search for the specific external device if failing in the search for the specific external device.

In another aspect of the present invention, a method of controlling a mobile terminal according to an embodiment of the present invention may include the steps of displaying a Bluetooth setting menu for a Bluetooth connection to a specific external device, performing a search for the specific external device if the Bluetooth connection to the specific external device is requested via the Bluetooth setting menu, and displaying an indication information indicating a failure of the search for the specific external device if failing in the search for the specific external device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, the present invention can also be applied to other types of terminals.

Figure 1:
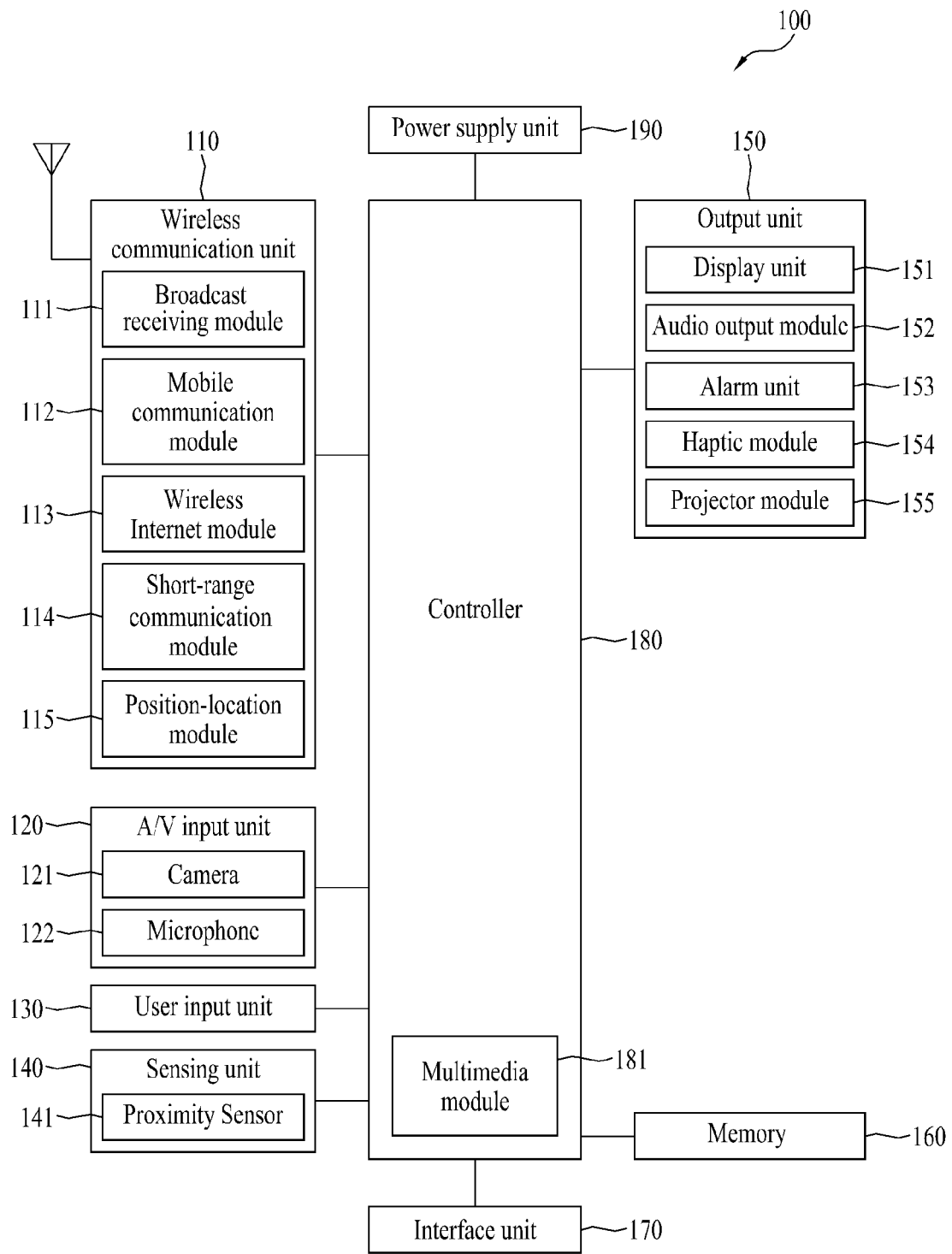
FIG. 1 illustrates a block diagram of a mobile terminal in accordance with one embodiment of the present invention.

FIG. 1 illustrates an exemplary block diagram of the mobile terminal 100 in accordance with one embodiment of the present invention. embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. The mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image to be projected via the light generated from the light source, and a lens for enlarging the projected image according to a predetermined focus distance. The projector module 155 can further include a device for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
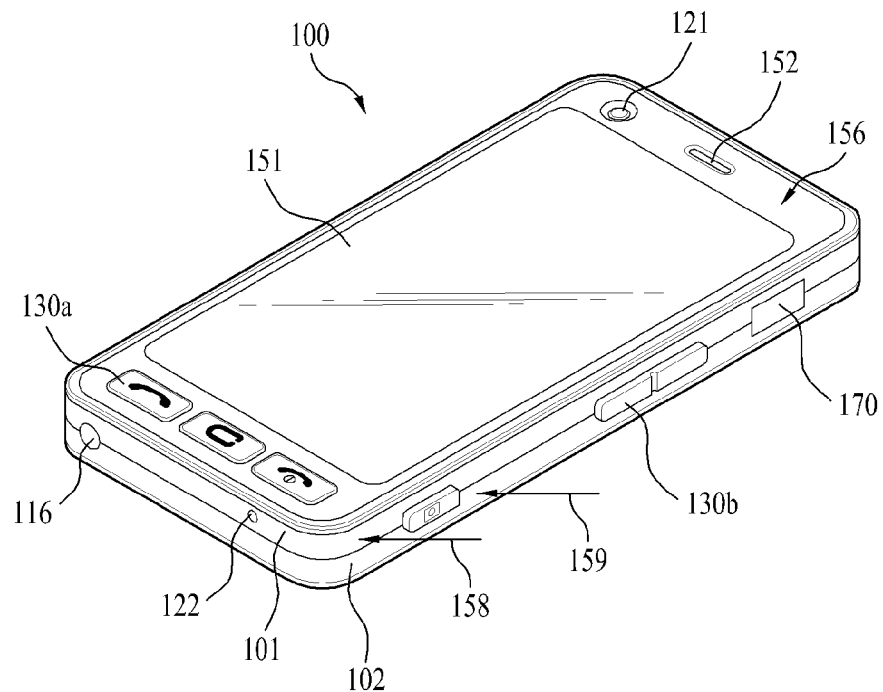
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130*a* and 130*b*, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130*a* and the microphone 122 can be located in proximity to another end of the display unit 151. As further shown in FIG. 2A, the user input module 130*b* and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130*a* and 130*b* shown in FIG. 2A. The user input modules 130*a* and 130*b* can each be referred to as a "manipulation unit" and can be configured to employ various methods and techniques of tactile manipulation and response to facilitate operation by the user.

The user input modules 130*a* and 130*b* can be configured for inputting different commands relative to one another. For example, the user input module 130*a* can be configured allow a user to input such commands as "start," "end," and "scroll" to the mobile terminal 100. The user input module 130*b* can allow a user to input a command for adjusting the volume of the audio output unit 152 or a command for switching to a touch recognition mode of the display unit 151.

Figure 2B:
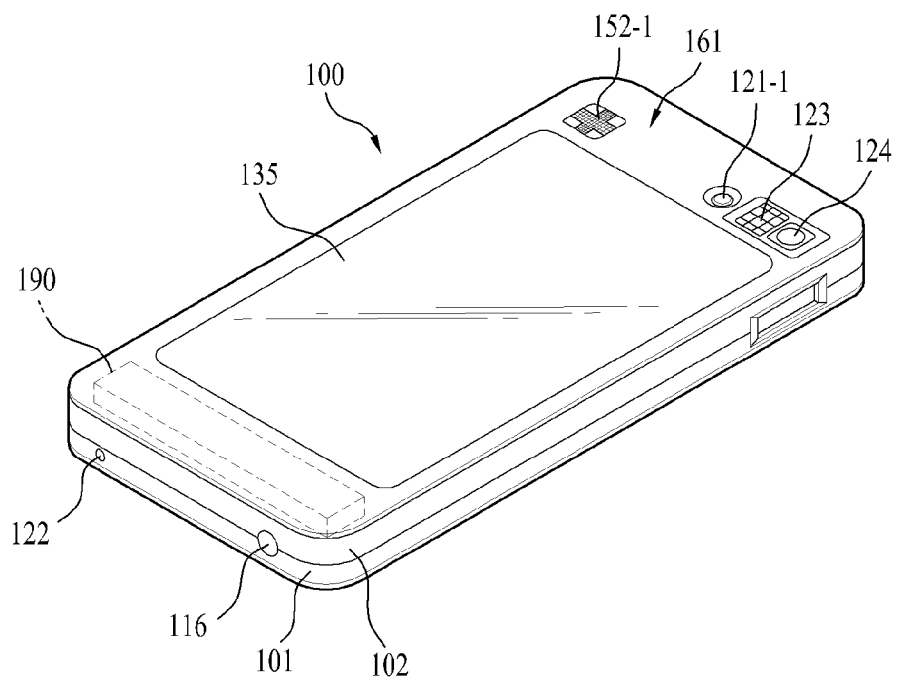
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, if a mobile terminal fails in searching for an external device to be connected to the mobile terminal by Bluetooth, a process for informing a user of the corresponding failure is explained with reference to FIGS. 3 to 13.

Figure 3:
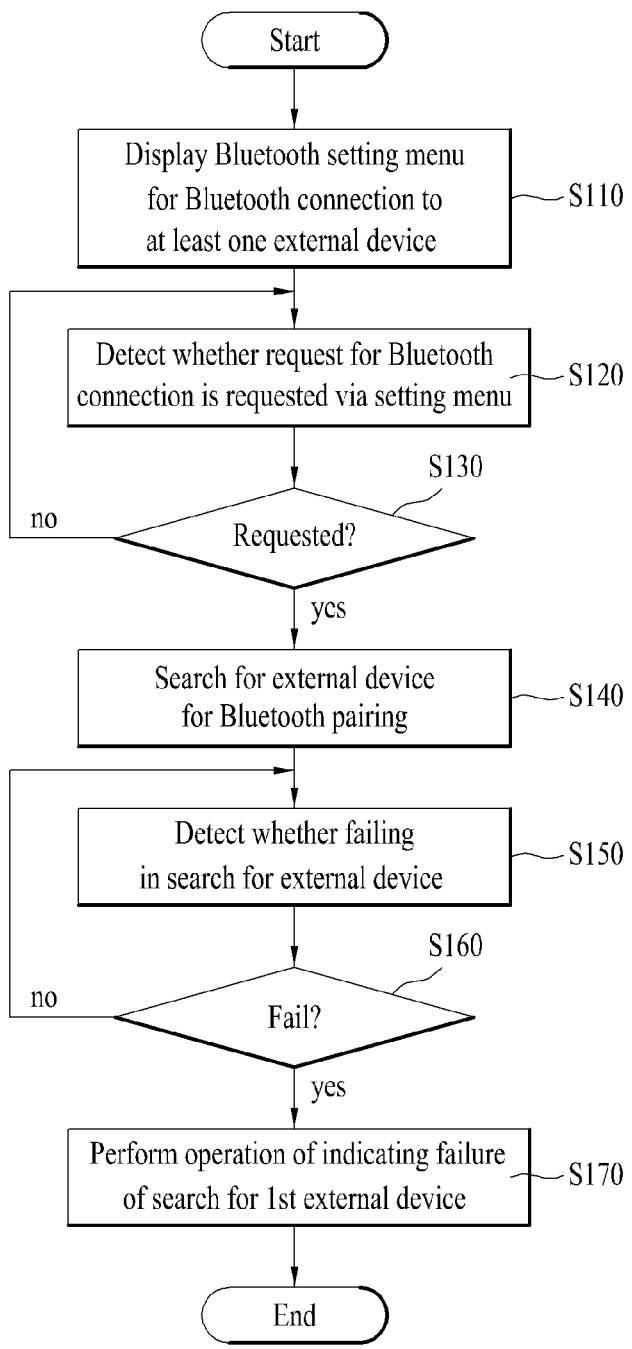
FIG. 3 is a flowchart for a process for informing a user of a failure in pairing for a Bluetooth connection between a mobile terminal and an external device according to an embodiment of the present invention.

FIG. 3 is a flowchart for a process for informing a user of a failure in pairing for a Bluetooth connection between a mobile terminal and an external device according to an embodiment of the present invention, and FIGS. 4 to 13 are diagrams of display screen configurations to implement a process for informing a user of a failure in pairing for a Bluetooth connection between a mobile terminal and an external device according to an embodiment of the present invention.

Referring to FIG. 3, if a Bluetooth setting menu for a Bluetooth connection to an external device is selected from a menu for environment settings of the mobile terminal 100, the controller 180 according to an embodiment of the present invention may control the Bluetooth setting menu to be displayed on the touchscreen 151 (S110).

In this instance, the Bluetooth setting menu may include a Bluetooth activation setting window, an 'allow my device search' setting window, a window for setting a type (category) of an external device to search for, an external device search window for a search, a list (hereinafter named a first list) of previously paired external devices, a list (hereinafter named a second list) of external devices connectable owing to a previously successful search, and the like.

In particular, external devices in a state of enabling a paring with the mobile terminal 100 owing to a previously successful search are updated on the second list. If a prescribed external device is selected from the external devices updated on the second list, the controller 180 is paired with the selected external device via the short range communication module 114 and then controls the first list to be updated to display the paired external device thereon. In particular, the external devices previously and/or currently paired with the mobile terminal 100 are updated on the first list.

Moreover, if a prescribed external device is selected from the external devices updated on the first list, the controller 180 establishes a Bluetooth connection to the selected external device via the short range communication module 114.

Meanwhile, if the Bluetooth activation setting window is selected, the controller 180 activates the short range communication module 114 to activate a function of the Bluetooth and then controls a Bluetooth indicator icon, which indicates that the Bluetooth function is activated, to be displayed on an indicator region situated at a top end portion of a screen of the touchscreen 151.

If the 'allow my device search' setting window is selected, the controller 180 allows the external devices to search the mobile terminal 100.

If the external device type setting window is selected, the controller 180 displays a list indicating types (e.g., headset, PC, mobile terminal, keyboard, mouse, all devices, etc.) of external devices to search. If a specific type is selected from the list, the controller 180 searches external devices corresponding to the selected type via the short range communication module 114.

If the external device search window is selected, the controller 180 searches external devices connectable by Bluetooth via the short range communication module 114.

As mentioned in the above description, the controller 180 detects whether a user makes a request for a Bluetooth connection to at least one external device via the Bluetooth setting menu (S120). If the request for the Bluetooth connection to the external device is made (Yes in S130), the controller 180 performs an operation of searching the external device to establish the Bluetooth connection to the external device (S140).

Thus, the external device may include a different user's mobile terminal having the configuration identical or similar to the mobile terminal 100 according to an embodiment of the present invention described with reference to FIG. 1 or an external device (e.g., PC, headset, keyboard, mouse, etc.) owned by the user of the mobile terminal 100. Moreover, the external device may include an external device the mobile terminal 100 attempts to search for the first time or an external device for which 'allow device search' of the present invention is not set up.

The search operation of the step S140 is described in detail as follows. First of all, the mobile terminal 100 broadcasts an inquiry message for searching for the external device on a preset frequency channel to a peripheral area. If the corresponding external device sends a response message to the mobile terminal 100 in response to the inquiry message received from the mobile terminal 100, the mobile terminal 100 is able to search for the external device.

However, if the response message is not received from the external device, the mobile terminal 100 is unable to perform a paring operation for the Bluetooth connection to the external device due to failure in finding the external device. A major reason for the failure in finding the external device lies in that the 'allow my device search' is not set up in the external device. Hence, the search failure occurs most frequently.

In particular, if the 'allow device search' is not set up in the external device, the external device does not send the response message to the mobile terminal 100 despite receiving the inquiry message from the mobile terminal 100. Therefore, the mobile terminal 100 is able to find the external device.

According to the related art, since the 'allow device search' is not set up in the external device, the mobile terminal 100 fails in searching for the external device to cause a failure in Bluetooth connection. However, because the 'allow device search' is not set up in the external device, a user is unable to obtain the Bluetooth connection failure from the mobile terminal 100.

Therefore, the present invention enables the external device search failure to be recognized by the user via the mobile terminal 100.

In the following description, an 'allow device search' enabled state of the external device is determined as an external device search success condition and an 'allow device search' disabled state of the external device is determined as an external device search failure condition.

Referring again to FIG. 3, if the external device search operation is performed in the step S140, the controller 180 detects whether a failure in the external device search occurs (S150). Preferably, since the response message in response to the inquiry message for the Bluetooth pairing is not received from the external device for the preset duration and the controller 180 fails in the search (Yes in S160), the controller 180 performs an operation of informing the user of the failure in the external device search (S170).

In particular, if the state of the external device matches the search failure condition (i.e., the 'allow device search' disabled state), the controller 180 performs an operation of informing the user of the failure in the external device search. Meanwhile, before the controller 180 performs the process shown in FIG. 3, each time external devices are found, the controller 180 updates the second list with the successfully found external devices.

While the second list is updated with the previously search-successful external devices, if the user requests a search for a specific external device to be connected by Bluetooth in a current area, the controller 180 searches the current area for Bluetooth-connectable external devices in a manner of broadcasting an inquiry message via the short range communication module 114.

Because all the external devices found in the current area exist in the second list, if the second list is not updated with a new external device, the controller 180 recognizes that the search for the specific external device the user attempts to connect by Bluetooth is not successful and can then perform an operation of informing the user of the failure in the search for the specific external device.

For instance, when the list is updated with 'PC', 'keyboard' and 'mouse', assuming that the specific external device the user attempts to connect by Bluetooth is 'headset', although the 'PC', the 'keyboard' and the 'mouse' have been found from the current area, if the 'headset' is not found yet, this means that a response message in response to the inquiry message is not received from the 'headset'. Therefore, the controller 180 recognizes that the search for the 'headset' is unsuccessful.

Moreover, according to an embodiment of the present invention, when the second list is updated with previously found external devices, information on a found location of each of the external devices can be saved in the memory 160 together with the updated second list. In particular, each time an external device is found, the controller 180 obtains a location information of a place of the found external device via the position location module 115 and then saves the obtained location information in the memory 160.

While the second list is updated with the previously search-successful external devices, if the user requests a search for a specific external device to be connected by Bluetooth in a current area, the controller 180 obtains a current location information via the position location module 115.

The controller 180 searches the current area for Bluetooth-connectible external devices by broadcasting an inquiry message via the short communication module and then obtains the external device found at the obtained current location among the external devices in the updated second list from the memory 160.

Comparing the external devices found in the current area to the obtained external devices in the second list, if a new external device different from the obtained external devices in the second list is not included in the external devices found in the current area, the controller 180 recognizes that the search for the specific external device the user attempts to connect by Bluetooth is not successful and can then perform an operation of informing the user of the failure in the search for the specific external device.

For instance, when 'PC', 'keyboard' and 'mouse' are found at the location information corresponding to 'home' of the user, assuming that the specific external device the user attempts to connect by Bluetooth is 'headset' located at the user's 'home', although the 'PC', the 'keyboard' and the 'mouse' have been found from the location of the user's 'home', if the 'headset' is not found yet, this means that a response message in response to the inquiry message is not received from the 'headset'. Therefore, the controller 180 recognizes that the search for the 'headset' is unsuccessful.

In the following description, a process for informing a user of a failure in searching for a specific external device to be connected by Bluetooth is explained in detail with reference to FIGS. 4 to 13.

Figure 4:
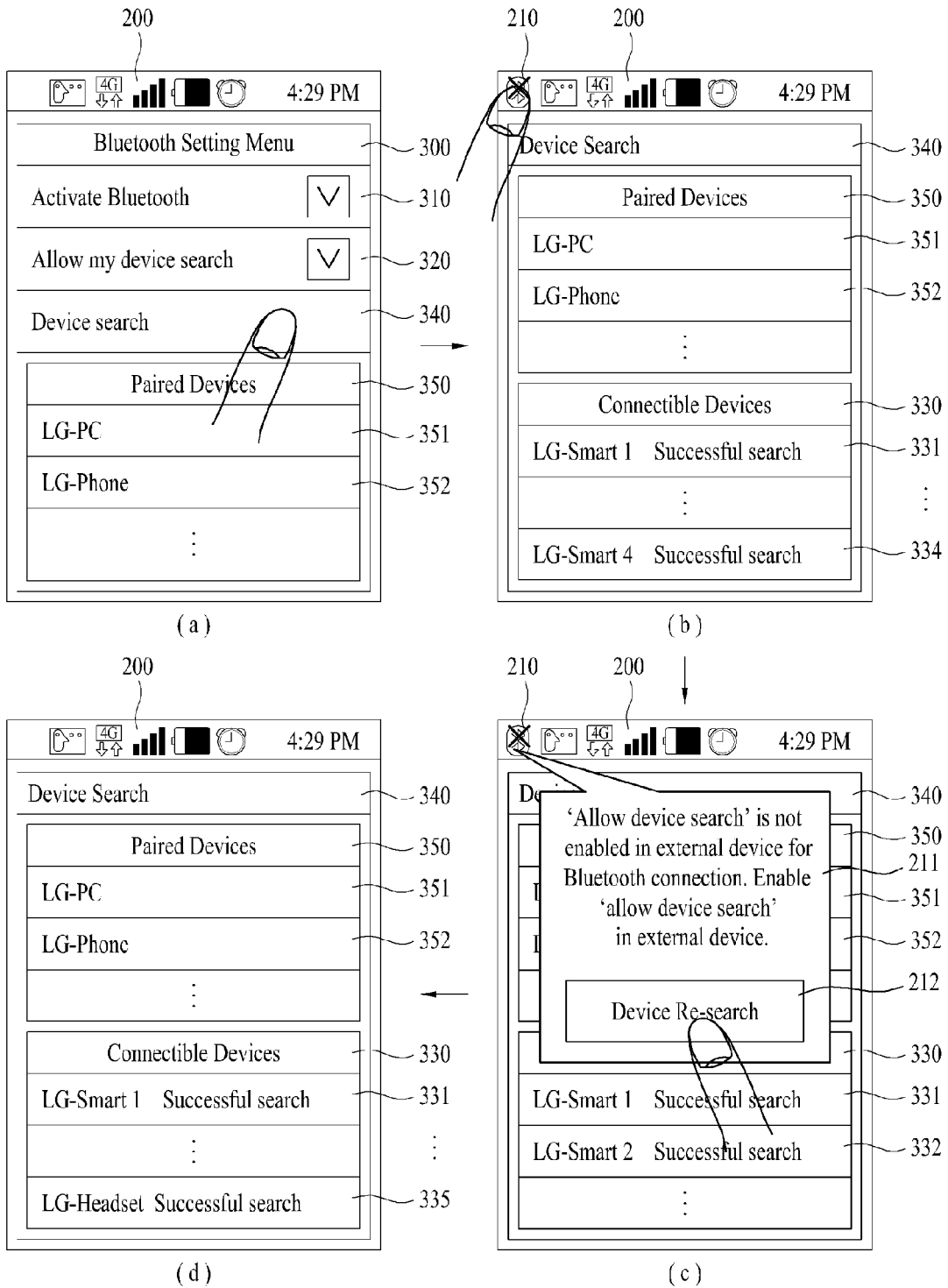
FIGS. 4 to 13 are diagrams of display screen configurations to implement a process for informing a user of a failure in pairing for a Bluetooth connection between a mobile terminal and an external device according to an embodiment of the present invention.

First, if a search for the specific external device is not successful, FIG. 4 shows a process for displaying an indicator icon 210 indicating a failure in the search for the specific external device on an indicator region 200 within a screen of the touchscreen 151.

For instance, in FIG. 4, the Bluetooth setting menu 300 described with reference to FIG. 3 is displayed on the screen of the touchscreen 151 and the specific external device is the 'headset' provided with a Bluetooth function. In the following description with reference to FIGS. 4 to 12, assume that an external device a user attempts to connect by Bluetooth is the 'headset'.

Referring to FIG. 4 (a), in order to connect the mobile terminal 100 of a user to the headset by Bluetooth, if a user enables 'activate Bluetooth' in a Bluetooth activation setting window 310 in the Bluetooth setting menu 300, the controller 180 activates the short range communication module 114 to activate the Bluetooth function.

Subsequently, if the user enables 'allow my device search' in a device search allow setting window 320 and selects an external device search window 340, the controller 180 performs an operation of searching a current area for external devices having the Bluetooth function via the short range communication module 114.

In this instance, a first list 350 updated with previously paired external devices is included in the Bluetooth setting window 300. For instance, the previously paired external devices on the first list 350 include LG-PC 351, LG-Phone 352 and the like.

Referring to FIG. 4 (b), if the external device search window 340 is selected, the controller 180 controls a second list 330, which is updated with previously search-successful external devices, to be displayed within the Bluetooth setting menu 300. For instance, the previously search-successful external devices on the second list 330 include LG-Smart 1 331 to LG-Smart 4 334.

If the controller 180 fails in searching for the headset the user attempts to connect by Bluetooth, referring to FIG. 4 (b), the controller 180 controls the indicator icon 210, which indicates a failure of the headset search, to be displayed within the indicator region 200 situated at a top end portion of the screen of the touchscreen 151.

In this instance, at least one or more indicator icons indicating various statuses of the mobile terminal 100 are displayed on the indicator region 200. The indicator region 200 is statically displayed on a top end of a screen in general. For instance, a remaining battery level indicator icon, an antenna reception strength indicator icon, a Wi-Fi reception strength indicator icon, a clock indicator icon, a bell sound/vibration mode indicator icon and the like are displayed on the indicator region 200.

If the indicator icon 210 indicating the failure of the headset search is selected, referring to FIG. 4 (c), the controller 180 informs the user of the reason for the failure in the Bluetooth connection to the headset in a manner of displaying information 211 indicating a cause of the failure of the headset search and a condition for a successful headset search.

As mentioned in the foregoing description with reference to FIG. 3, the reason for the failure in the headset search lies in that the 'allow device search' of the headset is not set up in the headset. The user recognizes the information 211 indicating the cause of the failure of the headset search and the condition for the successful headset search and can then search for the headset by enabling the 'allow device search' in the headset.

After the user has enabled the 'allow device search' in the headset, if the user selects a device re-search menu 212 (FIG. 4 (c)), the controller 180 re-searches for the headset via the short range communication module 114 (FIG. 4 (d)). If the headset search is successful, the controller 180 updates the second list 330 with information 'LG-Headset' 335 indicating the search-successful headset.

If the information 'LG-Headset' 335 indicating the headset is selected from the second list 350, the controller 180 performs an operation of pairing with the headset via the short range communication module 114 and then finally establishes the Bluetooth connection to the headset.

Figure 5:
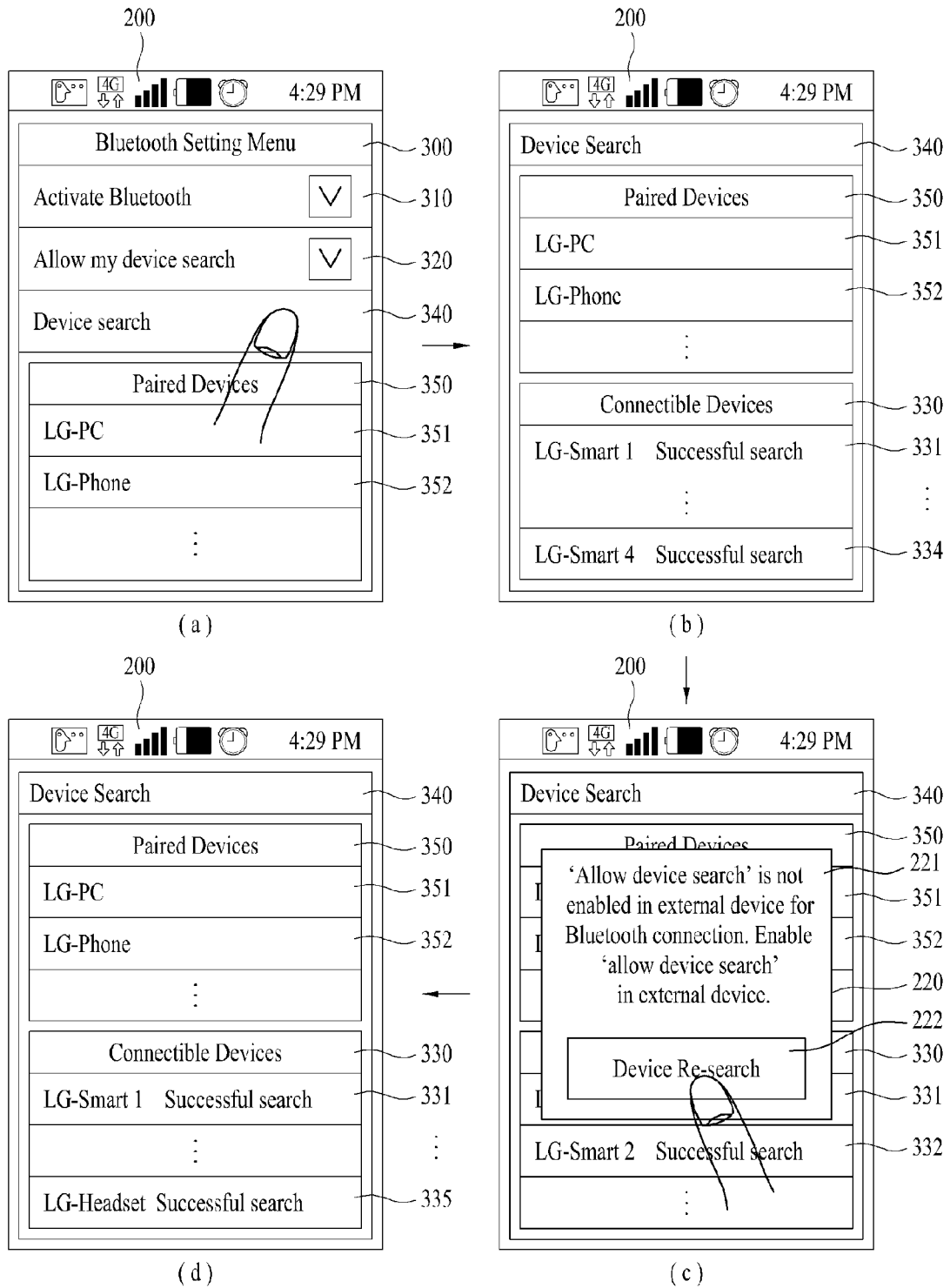

In another example, if the headset search is not successful, FIG. 5 shows a process for displaying the information indicating the failure of the headset search as a popup window on the Bluetooth setting menu 300. Referring to FIG. 5, if a user selects an external device search window 340 (FIG. 5 (*a*)), the controller 180 performs an operation of searching a current area for external devices having Bluetooth function via the short range communication module 114 and displays a second list, which is updated with previously search-successful external devices, on the Bluetooth setting menu 300 (FIG. 5 (*b*)).

If the controller 180 fails in the search for the headset the user attempts to connect by Bluetooth, referring to FIG. 5 (*c*), the controller 180 displays a popup window 220 indicating that the search for the headset is not successful. In this instance, information 221 indicating a cause of the headset search failure and a successful headset search condition and a re-search menu 222 for a re-search for the headset are included in the popup window 220.

In particular, the user recognizes the information 221 indicating the cause of the failure of the headset search and the condition for the successful headset search and can then search for the headset by enabling the 'allow device search' in the headset and then selecting the re-search menu 222.

After the user has enabled the 'allow device search' in the headset, if the user selects the device re-search menu 222 (FIG. 5 (*c*)), the controller 180 re-searches for the headset via the short range communication module 114 (FIG. 5 (*d*)). If the headset search is successful, the controller 180 controls the second list 330 to be displayed in a manner of being updated with information 'LG-Headset' 335 indicating the search-successful headset.

Figure 6:
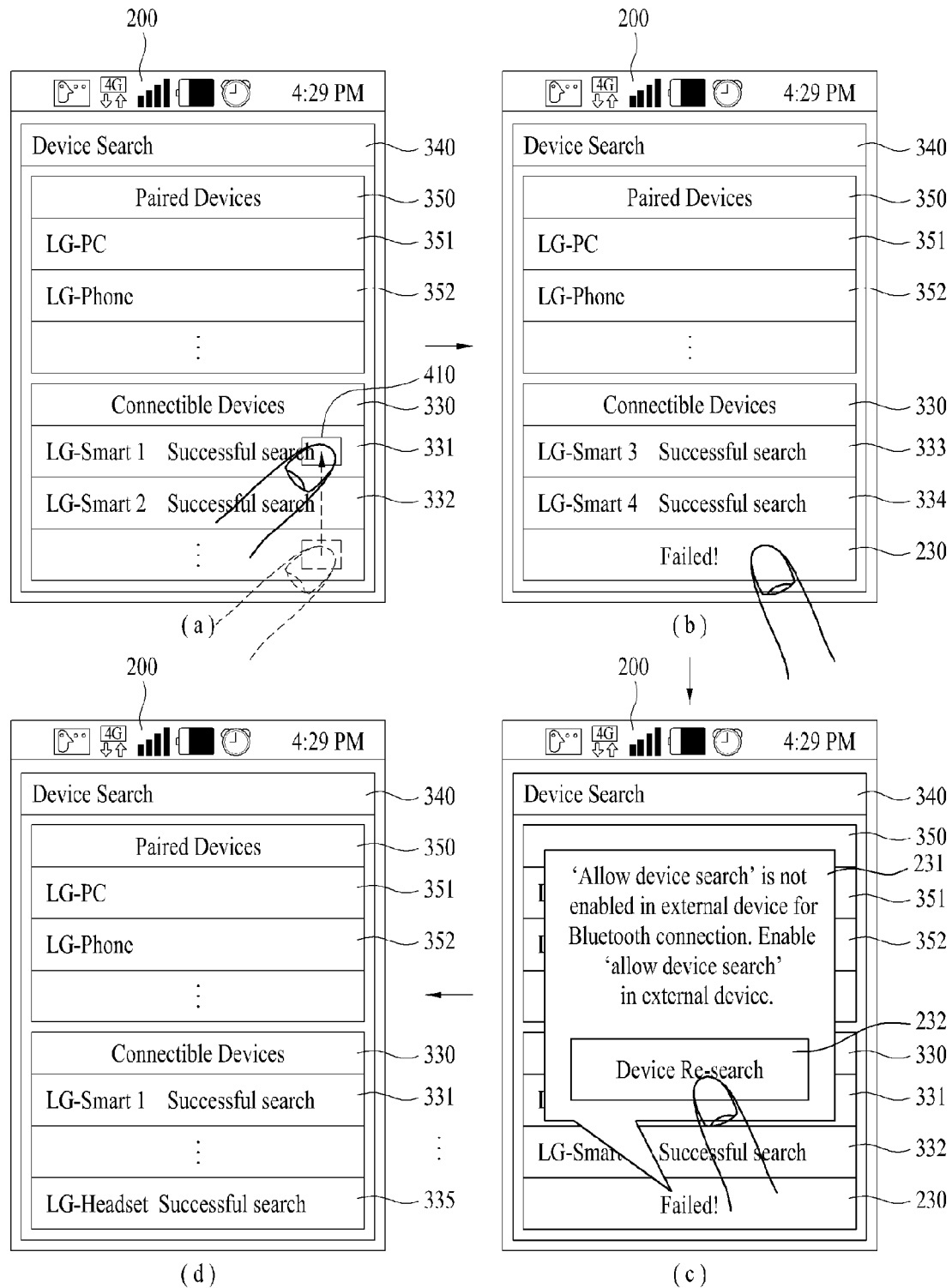
Figure 7:
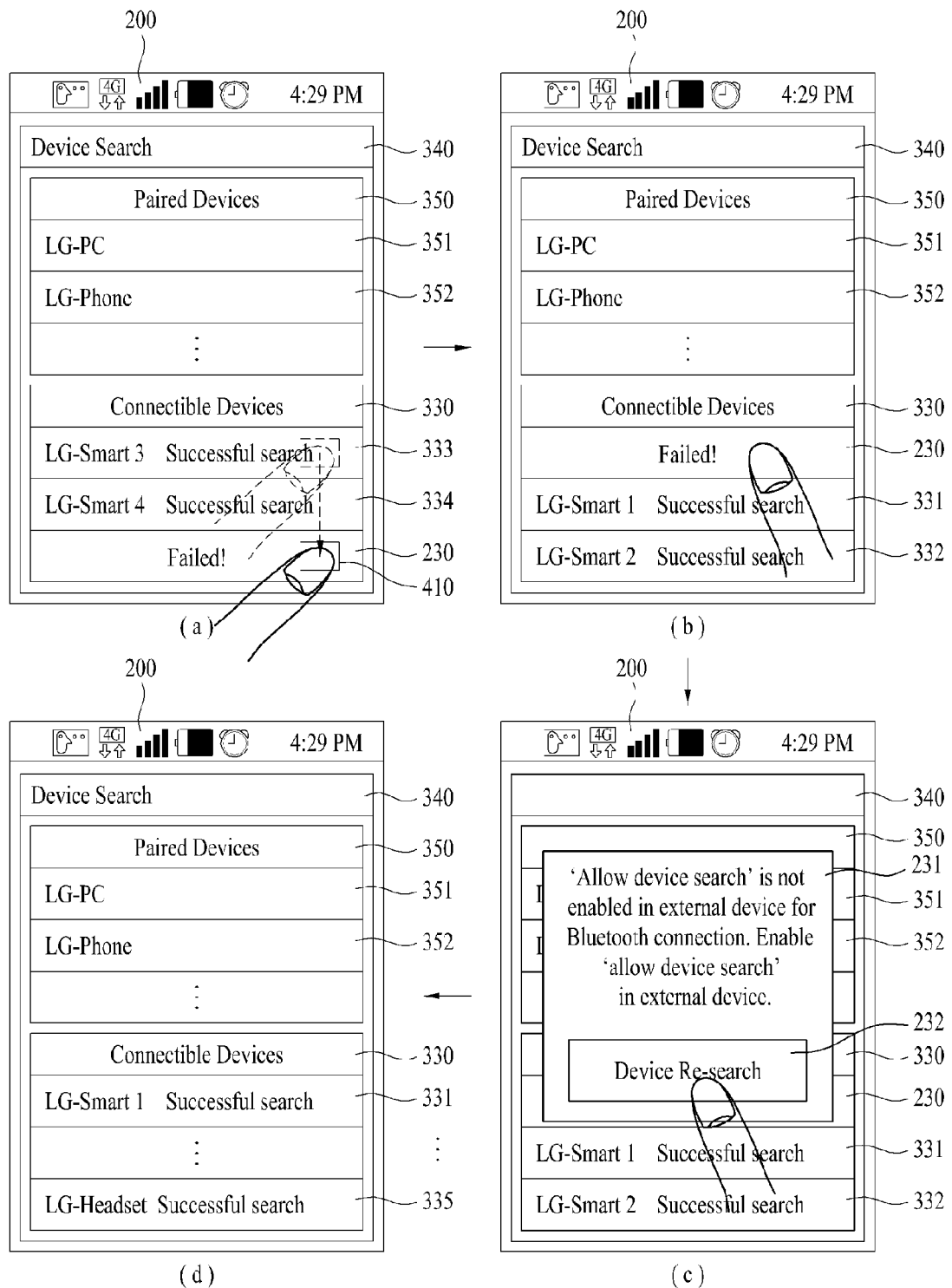

In another example, if the search for the headset is not successful, FIG. 6 and FIG. 7 show a process for enabling the user to quickly recognize the failure in the Bluetooth connection to the headset to be connected by Bluetooth by checking the second list 330 in a manner that information indicating the failure of the headset search is displayed on a top or bottom end line in the second list 330.

Referring to FIG. 6, if the search for the headset is not successful, the controller 180 controls information, which indicates the failure of the headset search, to be displayed on a bottom line in the second list 330.

In particular, referring to FIG. 6 (*a*), if a specific point of the second list 330 is touched, the controller 180 displays a scroll bar 410 on the touched point. If the scroll bar 410 is shifted to a bottom end line in the second list 330 by a user's touch action, referring to FIG. 6 (*b*), the controller 180 controls an indication information 230, which indicates the failure of the headset search, to be displayed on the bottom end line in the second list 330.

In particular, the user is able to recognize that the Bluetooth connection to the headset is unsuccessful by viewing the indication information 230 displayed on the last line after checking the whole second list 330 to the end.

If the indication information 230 is selected, referring to FIG. 6 (*c*), the controller 180 displays information 231 indicating a cause of the headset failure and a condition for a successful headset search, thereby informing the user of the cause of the headset search failure and leading the user to succeed in the headset search.

After the user has enabled 'allow device search' in the headset, if the user selects a device re-search menu 232 (FIG. 6 (*c*)), the controller 180 re-searches for the headset via the short range communication module 114. If the re-search for the headset is successful, the controller 180 controls the second list 330 to be displayed in a manner of being updated with information 'LG-Headset' 335 indicating the search-successful headset.

Referring to FIG. 7, if the controller 180 fails in the search for the headset, the controller 180 controls information, which indicates the failure of the headset search, to be displayed on a top end line in the second list 330.

In particular, while the indication information 230 is displayed on the bottom end line in the second list 330 by the process shown in FIG. 6, if the scroll bar 410 in the second list 330 is shifted to a top end line in the second list 330 by a user's touch action (FIG. 7 (*a*)), the controller 180 controls an indication information 230, which indicates the failure of the headset search, to be displayed on the top end line in the second list 330 (FIG. 7 (*b*)).

In particular, since the user may not check the indication information 230 displayed on the last line after checking the last line of the second list 330, if the user scrolls the last line of the second list 330 to a first line of the second list 330, the controller 180 controls the indication information 230 to be re-displayed on the first line.

If the indication information 230 is selected, referring to FIG. 7 (*c*), the controller 180 displays information 231 indicating a cause of the headset search failure and a condition for a successful search for the headset. After the user has enabled 'allow device search' in the headset, if the user selects a device re-search menu 232, the controller 180 re-searches for the headset via the short range communication module 114. If the re-search for the headset is successful, the controller 180 controls the second list 330 to be displayed in a manner of being updated with information 'LG-Headset' 335 indicating the search-successful headset.

In doing so, as the indication information 230 displayed by the process shown in FIG. 6 or FIG. 7 is selected by the user, until the information 231 indicating a cause of the headset search failure and a condition for a successful search for the headset is displayed, the controller 180 maintains the display of the indication information 230 on the top or bottom end line of the second list 330.

If the scroll bar 410 is displayed on the second list 330, the controller 180 additionally displays the indication information 230 inside or around the scroll bar 410, thereby enabling the user to further notice the failure of the headset search (not shown in FIG. 6 or FIG. 7).

Figure 8:
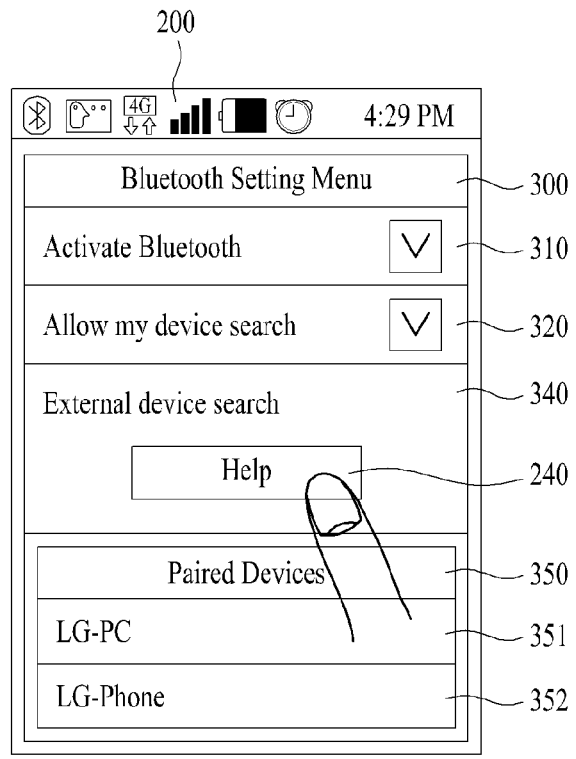
Figure 8:
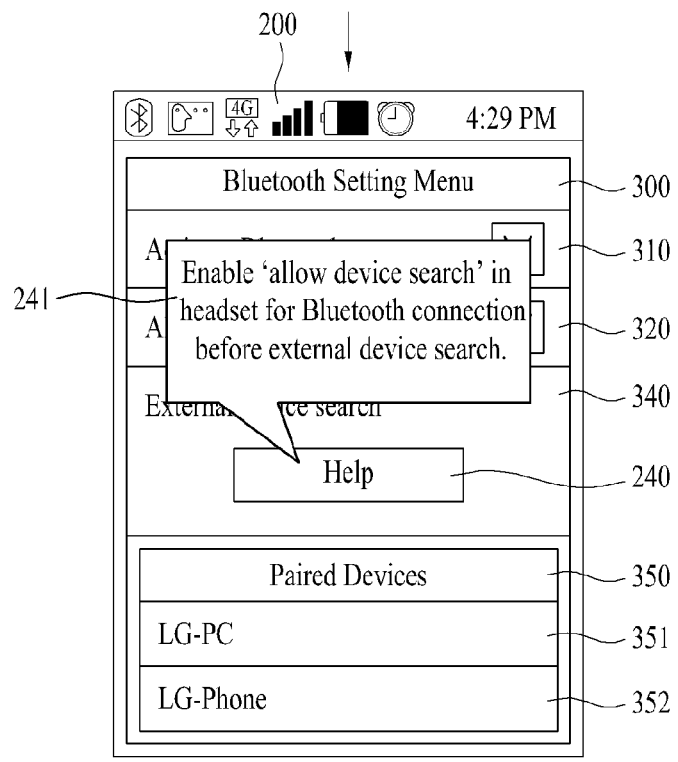

Next, FIG. 8 shows a process for providing the external device search window 340 with help information indicating a condition for a successful search for the headset before the mobile terminal 100 searches for the headset.

Referring to FIG. 8 (*a*), the controller 180 controls a help icon 240, which is provided to display a condition for a successful search for the headset in the mobile terminal 100, to be displayed within the external device search window 340 of the Bluetooth setting menu 300. Referring to FIG. 8 (*b*), if the help icon 240 is selected, the controller 180 displays help information 241 indicating the condition for the successful search for the headset. As mentioned in the foregoing description, the condition for the successful search for the headset means a state that 'allow device search' is enabled in the headset.

In particular, since the user has to select the external device search window 340 to search for the headset, if the help icon 240 is displayed within the external device search window, the user can re-check whether the 'allow device search' is enabled in the headset.

Meanwhile, if the external device search window 340 is selected without displaying the help icon 240 on the external device search window 340, the controller 180 keeps displaying the help information 241 for preset duration and can then perform an operation of searching a current area for external devices having Bluetooth function via the short range communication module 114. In this instance, the preset duration may correspond to a time enough for the user to enable 'allow device search' in the headset after checking the help information 241.

Figure 9:
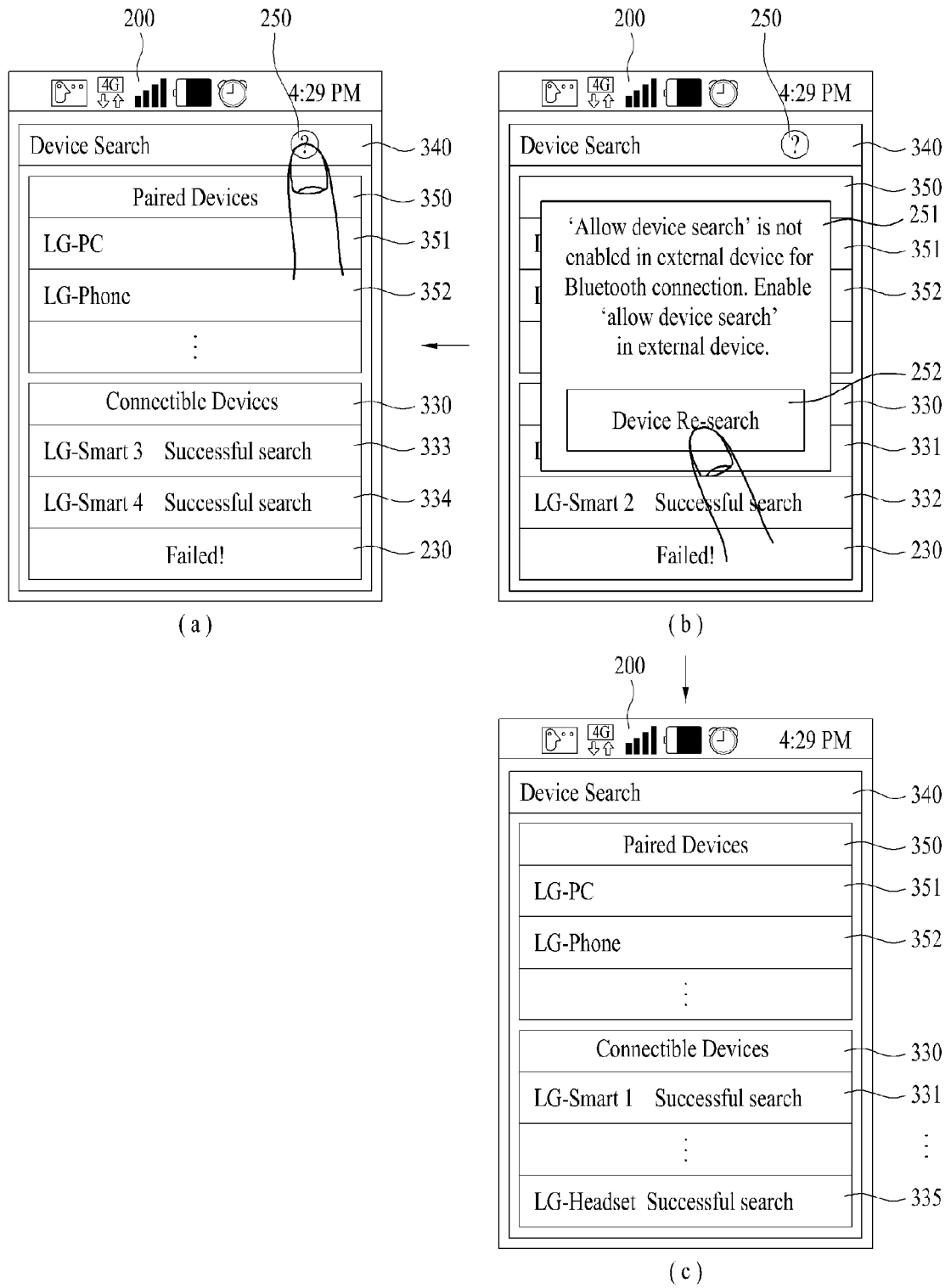

In another example, if the headset search is not successful, FIG. 9 shows a process for displaying an icon indicating the failure of the headset search on the external device search window 340. Referring to FIG. 9 (a), if the controller 180 fails in searching for the headset, the controller 180 controls an icon 250, which indicates the failure of the headset search, to be displayed within the external device search window 340 of the Bluetooth setting menu 300.

Thus, the controller 180 displays the icon 250 within the external device search window 340, thereby enabling a user to easily recognize the icon 250 within the Bluetooth setting menu 300. If the indication information 250 is selected, referring to FIG. 9 (b), the controller 180 displays information 251 indicating a cause of the headset search failure and a condition for a successful search for the headset. After the user has enabled 'allow device search' in the headset, if the user selects a device re-search menu 252, referring to FIG. 9 (c), the controller 180 re-searches for the headset via the short range communication module 114. If the re-search for the headset is successful, the controller 180 controls the second list 330 to be displayed in a manner of being updated with information 'LG-Headset' 335 indicating the search-successful headset.

Figure 10:
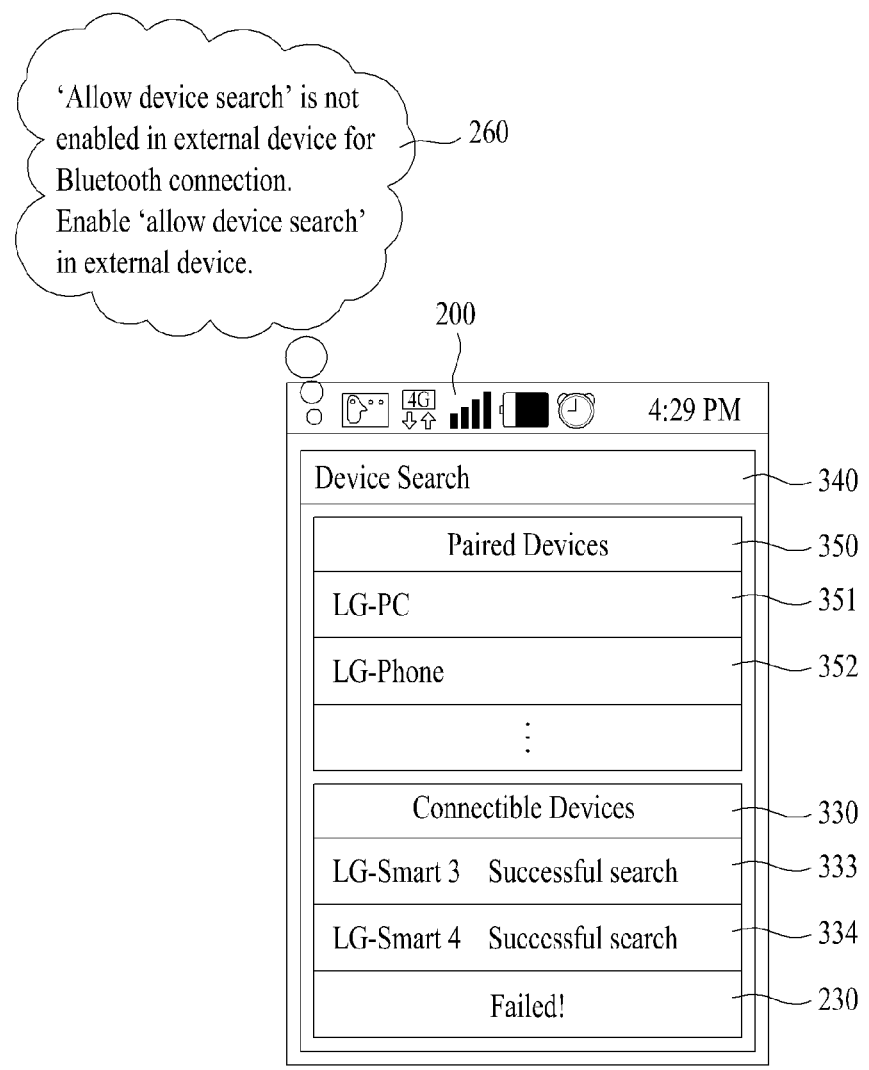

FIG. 10 shows a process for outputting an audio indicating the failure of the headset search if the search for the headset is unsuccessful. Referring to FIG. 10, if the controller 180 fails in a search for the headset, the controller 180 outputs an audio indicating the failure of the headset search via the audio output module 152. The audio may include an effect or warning sound for enabling a user to quickly notice the failure of the headset search or a guidance sound indicating a cause of the headset search failure and a condition for a successful search for the headset.

After the user has listened to the audio 260 output from the mobile terminal 100 and then enabled 'allow device search' in the headset, if the user gives a command for a device re-search for the headset, the controller 180 re-searches for the headset via the short range communication module 114. If the re-search for the headset is successful, the controller 180 controls the second list 330 to be displayed in a manner of being updated with information 'LG-Headset' 335 indicating the search-successful headset.

Figure 11:
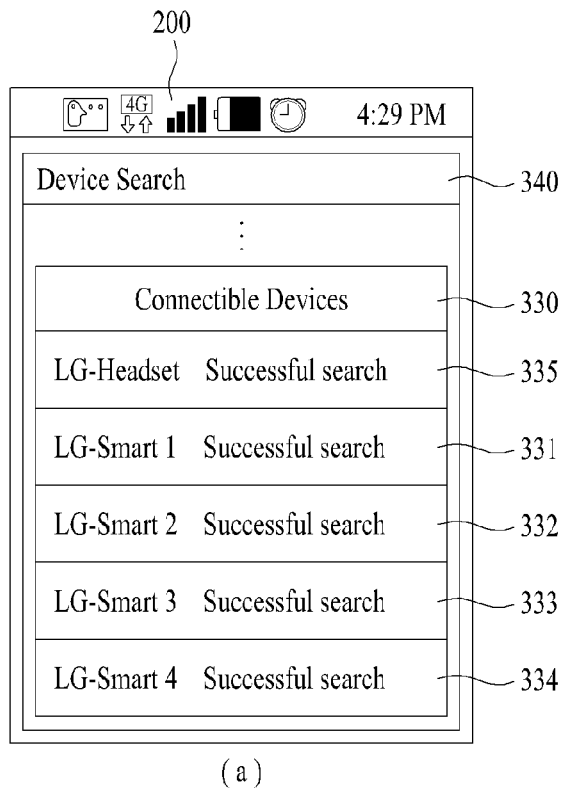
Figure 11:
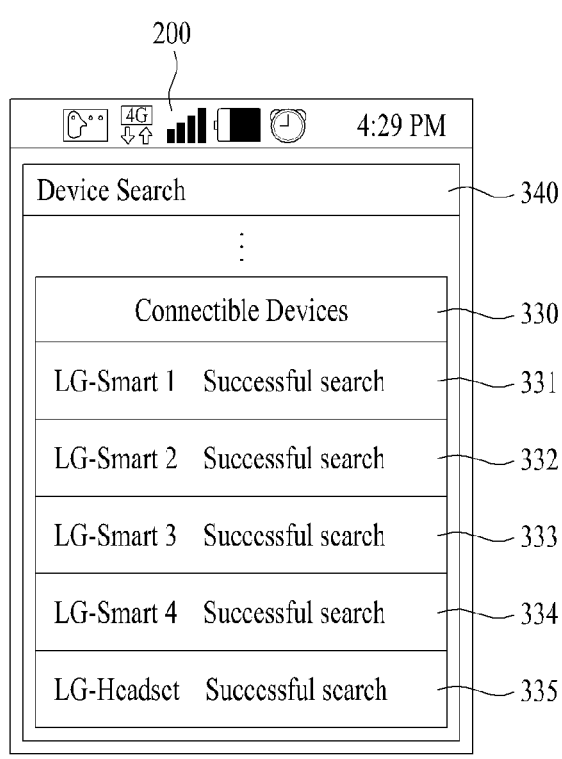
Figure 12:
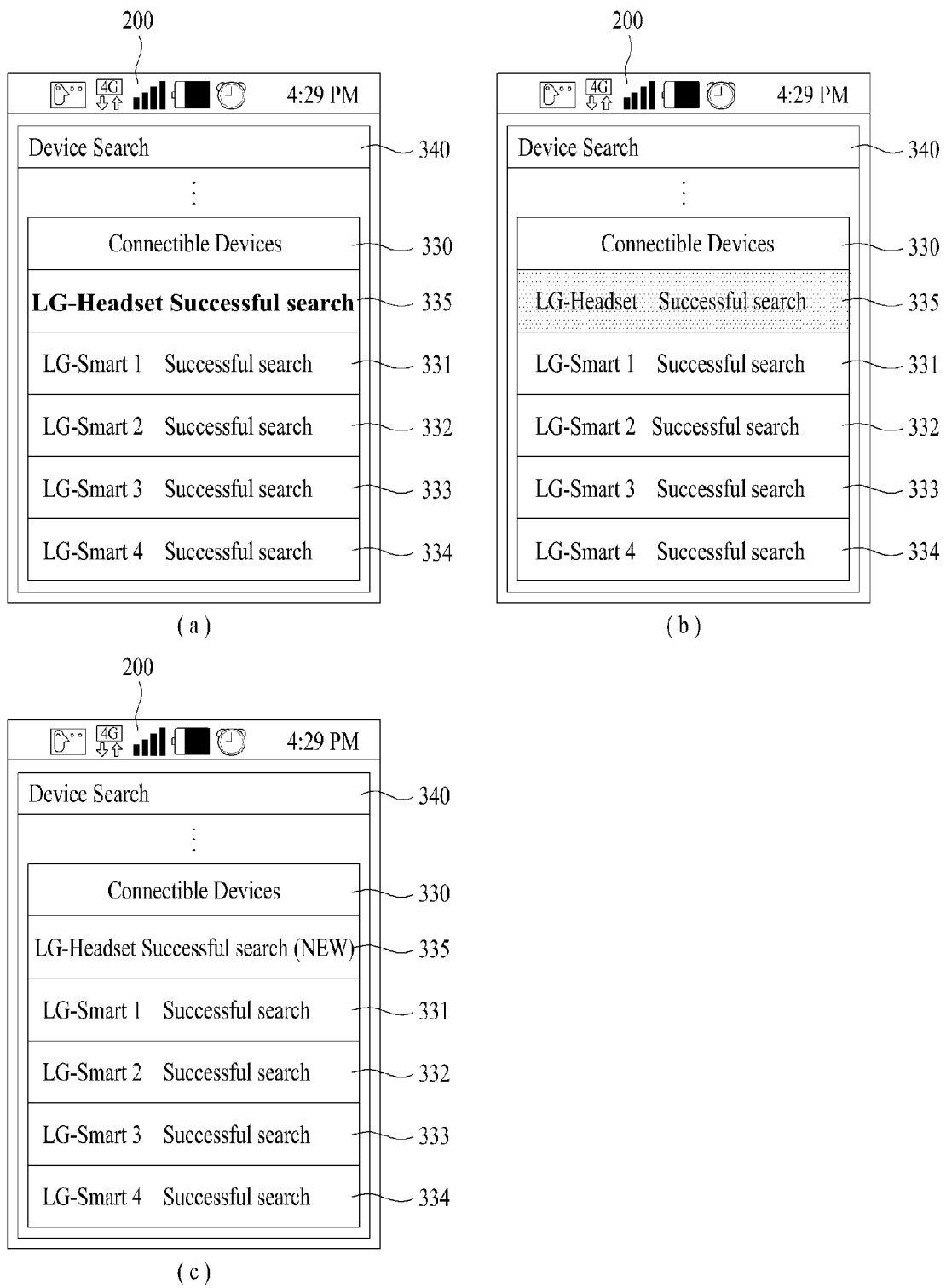

After the search for the headset has been unsuccessfully completed by the process shown in one of FIGS. 3 to 10, if 'allow device search' is enabled in the headset and a re-search for the headset is then performed successfully, FIG. 11 or FIG. 12 shows a process for displaying the found headset within the second list 330 in a manner of being identifiable from other previously search-successful external devices on the second list 330.

Referring to FIG. 11 (a), after the search for the headset has been unsuccessfully completed by the process shown in one of FIGS. 3 to 10, if the re-search is successfully completed, the controller 180 updates the second list 330 with information 335 indicating the headset in a manner of displaying the information 335 on a top end line of the second list 330.

Referring to FIG. 11 (b), after the search for the headset has been unsuccessfully completed by the process shown in one of FIGS. 3 to 10, if the re-search is successfully completed, the controller 180 updates the second list 330 with information 335 indicating the headset in a manner of displaying the information 335 on a bottom end line of the second list 330.

In particular, if the second list 330 is updated with the information 335 indicating the search-successful headset in a manner of displaying the information 335 on the top or bottom end line of the second list 330, the user is able to quickly notice that the search for the headset to be connected by Bluetooth is successfully found by viewing the second list 330. And, the user is guided to select the headset to pair with the mobile terminal 100.

Meanwhile, when there are at least two external devices (including the headset) the user intends to connect by Bluetooth, if a re-search for the at least two external devices is successfully completed after the search failure by one of the processes shown in FIGS. 3 to 10, the successfully found at least two external devices can be displayed within the second list 330 in a manner of being sorted out of other external devices 331 to 334 previously found by previous searches.

For instance, the controller 180 updates the successfully found at least two external devices on first and second lines within the second list 330 and also updates other external devices 331 to 334 previously found by previous searches on $3^{rd}$ to $5^{th}$ lines within the second list 330, respectively. On the contrary, the controller 180 updates other external devices 331 to 334 previously found by previous searches on first to $3^{rd}$ lines within the second list 330 and also updates the successfully found at least two external devices on $4^{th}$ and $5^{th}$ lines within the second list 330, respectively.

Referring to FIG. 12, after the search for the headset has been unsuccessfully completed by the process shown in one of FIGS. 3 to 10, if the re-search is successfully completed, the controller 180 updates the second list 330 with information 335 indicating the headset in a manner of being discriminated from other external devices 331 to 334 previously found by previous searches within the second list 330.

In particular, the controller 180 controls the information 335 indicating the headset to be displayed within the second list 330 in a manner of having a display style different from that of other external devices 331 to 334 previously found by previous searches, thereby enabling the user to quickly notice that the search for the headset to be connected by Bluetooth is successfully found by viewing the second list 330 as well as guiding the user to select the headset to pair with the mobile terminal 100.

For instance, referring to FIG. 12 (a), the controller 180 enables the user to quickly recognize the information 335 indicating the headset within the second list 330 in a manner that a font thickness of the information 335 indicating the headset 335 is set greater than that of other external devices 331 to 334 previously found by previous searches within the second list 330.

In another instance, referring to FIG. 12 (b), the controller 180 enables the user to quickly recognize the information 335 indicating the headset within the second list 330 in a manner that the information 335 indicating the headset 335 is highlighted in specific color within the second list 330.

In another instance, referring to FIG. 12 (c), the controller 180 enables the user to quickly recognize the information 335 indicating the headset within the second list 330 in a manner that a text (e.g., NEW) indicating that the headset is a newly found external device is displayed within the line on which the information 335 indicating the headset is displayed within the second list 330.

In still another instance, the controller 180 enables the user to quickly recognize the information 335 indicating the headset within the second list 330 in a manner that the information 335 indicating the headset is displayed within the second list 330 by being enlarged and that other external devices 331 to 334 previously found by previous searches are displayed within the second list 330 by being reduced.

In another instance, the controller 180 enables the user to quickly recognize the information 335 indicating the headset within the second list 330 in a manner that the information 335 indicating the headset is displayed within the second list 330 by blinking.

In yet another instance, the controller 180 enables the user to quickly recognize the information 335 indicating the headset within the second list 330 in a manner that the information 335 indicating the headset is displayed in color (or brightness) within the second list 330 and that other external devices 331 to 334 previously found by previous searches are displayed in black & white (or darkness) within the second list 330.

In still another instance, the controller 180 enables the user to quickly recognize the information 335 indicating the headset within the second list 330 in a manner that the information 335 indicating the headset is displayed in 3D within the second list 330 and that other external devices 331 to 334 previously found by previous searches are displayed in 2D within the second list 330.

Figure 13:
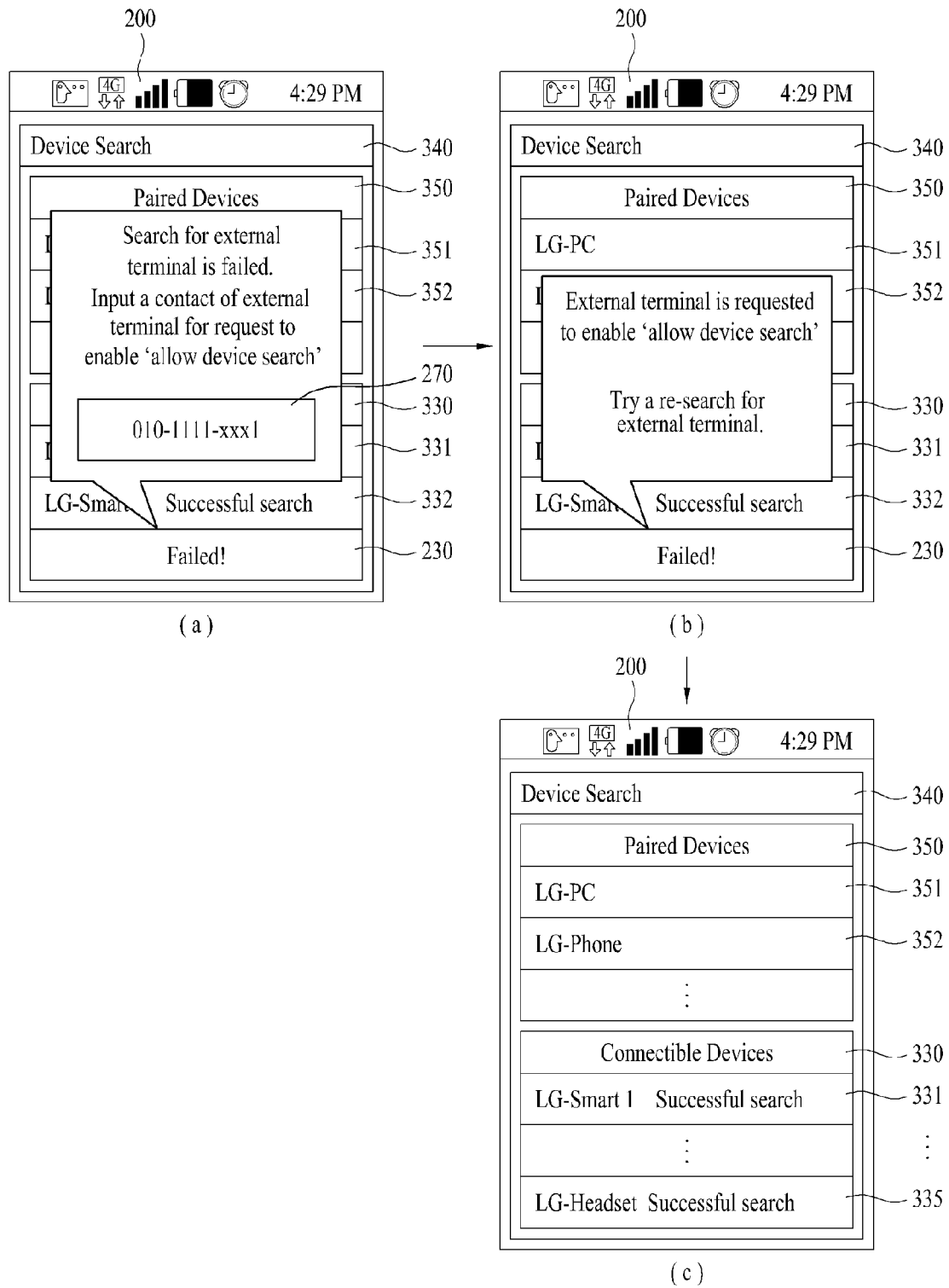

When an external device a user attempts to connect by Bluetooth includes an external terminal (e.g., a terminal having a configuration identical/similar to that of the mobile terminal shown in FIG. 1) capable of other communications (e.g., mobile communication, internet communication, etc.) with the mobile terminal 100 other than Bluetooth, if the search for the external terminal is unsuccessfully completed, FIG. 13 shows a process for succeeding in the search for the external terminal by making a request for enabling 'allow device search' to the external terminal.

Referring to FIG. 13 (*a*), if the controller 180 fails in searching for the external terminal, the controller 180 performs an operation of indicating the failure of the external terminal search by one of the processes shown in FIGS. 3 to 10 and also displays window 270 for inputting a contact of the external terminal. Thus, the user may directly input the contact of the external terminal via the contact input window 460 or may select a contact corresponding to the external terminal from a phonebook saved in the memory 160.

In this instance, a contact number of the external terminal may include a phone number, email address and/or chat ID of an owner of the external terminal Referring to FIG. 13 (*b*), the controller 180 controls the wireless communication unit 110 to transmit a signal for requesting 'allow device search' to be enabled to the contact of the external terminal owner. After prescribed duration, the controller 180 re-searches for the external terminal via the short range communication module 114. If the re-search for the external terminal is successfully completed, referring to FIG. 13 (*c*), the controller 180 controls the second list 330 to be displayed in a manner of being updated with information 'LG-Phone 2' 335 indicating the search-successful external terminal.

Thus, if the phone number of the external terminal owner is inputted to the contact input window 270, the controller 180 sends a message containing information for requesting to enable 'allow device search' via the mobile communication module 112. If receiving the message from the mobile terminal 100, the external terminal displays the information for requesting to enable 'allow device search' in the message on the screen, thereby guiding the external terminal owner to enable the 'allow device search'.

If the email address of the external terminal owner is inputted to the contact input window 270, the controller 180 sends an email containing information for requesting to enable 'allow device search' via the wireless internet module 113. If receiving the message from the mobile terminal 100, the external terminal displays the information for requesting to enable 'allow device search' in the email on the screen, thereby guiding the external terminal owner to enable the 'allow device search'.

While a messenger for chatting with the external terminal owner is active, if the chat ID of the external terminal owner is inputted to the contact input window 270, the controller 180 sends a chat message containing information for requesting to enable 'allow device search' via the messenger. If receiving the chat message from the mobile terminal 100, the external terminal displays the information for requesting to enable 'allow device search' in the chat message on the screen, thereby guiding the external terminal owner to enable the 'allow device search'.

Meanwhile, if the contact of the external terminal owner is inputted to the contact input window 270, the controller 180 transmits a signal for requesting the external terminal to enable a display of the Bluetooth setting menu and 'allow device search' to the contact of the external terminal owner via the wireless communication unit 110. If receiving the request signal from the mobile terminal 100, the external terminal pages and displays the Bluetooth setting menu on the screen and also displays the information for requesting to enable the 'allow device search' on the Bluetooth setting menu, thereby guiding the external terminal owner to enable the 'allow device search' on the currently displayed Bluetooth setting menu.

Finally, if the external terminal owner enables the 'allow device search', the external terminal transmits information indicating that the 'allow device search' is enabled to the mobile terminal 100. If receiving the information indicating that the 'allow device search' is enabled from the external terminal, the controller 180 is able to perform an operation of searching for the external terminal via the short range communication module 114 in direct without a user's action of selecting the device re-search menu.

Accordingly, in a mobile terminal and controlling method thereof according to an embodiment of the present invention, if the mobile terminal fails in a search for an external device to connect by Bluetooth, the present invention provides a user with the search failure, a reason for the search failure and the like, thereby enabling the user to perform Bluetooth settings of the external device to establish the Bluetooth connection to the mobile terminal.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display unit configured to display a Bluetooth setting menu for establishing a Bluetooth connection to a specific external device;
   a short range communication module configured to attempt to establish the Bluetooth connection to the specific external device; and
   a controller configured to:
   receive an input request for attempting to establish the Bluetooth connection to the specific external device via the Bluetooth setting menu,
   control the short range communication module to search for the specific external device to attempt to establish the Bluetooth connection with the specific external device, and
   control the display unit to display indication information indicating a failure of the search for the specific external device if the search for the specific external device fails,
   wherein the Bluetooth setting menu includes an allow device search option for turning on an allow device search feature in the specific external device.

2. The mobile terminal of claim 1, wherein the allow device search option is output only when the search for the specific external device fails.

3. The mobile terminal of claim 1, wherein the Bluetooth setting menu includes a search window for inputting information used to search for the specific external device, and the controller is further configured to display the allow device search option for turning on the allow device search feature in the specific external device before searching for the specific external device.

4. The mobile terminal of claim 1, wherein the controller is further configured to control an audio output module to output an audio indicating the search for the specific external device has failed.

5. The mobile terminal of claim 1, wherein the controller is further configured to control the display unit to display the allow device search option as a popup window on the Bluetooth setting menu.

6. The mobile terminal of claim 1, wherein the controller is further configured to control the display unit to display the indication information as an indicator icon within an indicator region displayed on the display unit.

7. The mobile terminal of claim 1, wherein the Bluetooth setting menu includes a list updated with other external devices successfully found by a previous search, and
   wherein the controller is further configured to control the display unit to display the indication information on a top or bottom end line within the list.

8. The mobile terminal of claim 7, wherein the controller is further configured to control the indication information to continuously be displayed on a corresponding line until the indication information is selected and confirmed.

9. The mobile terminal of claim 1, wherein the Bluetooth setting menu includes a list updated with other external devices successfully found by a previous search, and
   wherein the controller is further configured to control the display unit to display the indication information within a scroll bar region if the scroll bar displayed within the list is shifted.

10. The mobile terminal of claim 1, wherein the controller is further configured to control the short range communication module to re-search for the specific external device when the allow device search option is selected.

11. The mobile terminal of claim 10, wherein the Bluetooth setting menu includes a list updated with other external devices successfully found by a previous search, and
    wherein, if the re-search finds the specific external device, the controller is further configured to update the list with the found specific external device and distinctively identify the found specific external device within the list.

12. The mobile terminal of claim 11, wherein the controller is further configured to distinctively identify the found specific external device by at least one of:
    changing a display style of the found specific external device to be different from that of the other external devices,
    displaying the found specific external device on a top or bottom end within the list, and
    displaying new information next to the found specific external device.

13. The mobile terminal of claim 1, further comprising:
    a wireless communication unit configured to wirelessly communicate with the specific external device using a communication protocol other than Bluetooth,
    wherein if the search for the specific external device fails, the controller is further configured to control the wireless communication unit to transmit a signal to the specific external device for turning on the allow device search feature using the communication protocol other than the Bluetooth.

14. The mobile terminal of claim 13, wherein the controller is further configured to control the wireless communication unit to transmit the signal to a contact included on the mobile terminal.

15. The mobile terminal of claim 13, wherein the controller is further configured to receive information from the specific external device indicating that the allow device search feature is enabled in the specific external device via the wireless communication unit, and to control the display unit to display information requesting a user re-search for the specific external device.

16. A method of controlling a mobile terminal, the method comprising:
    displaying, via a display unit, a Bluetooth setting menu for establishing a Bluetooth connection to a specific external device;
    attempting, via a short range communication module, to establish the Bluetooth connection to the specific external device;
    receiving, via a controller, an input request for attempting to establish the Bluetooth connection to the specific external device via the Bluetooth setting menu;
    searching, via the short range communication module, for the specific external device to attempt to establish the Bluetooth connection with the specific external device; and
    displaying, via the display unit, indication information indicating a failure of the search for the specific external device if the search for the specific external device fails,
    wherein the Bluetooth setting menu includes an allow device search option for turning on an allow device search feature in the specific external device.

17. A mobile terminal, comprising:
- a display unit configured to display a Bluetooth setting menu for establishing a Bluetooth connection to a specific external device;
- a short range communication module configured to attempt to establish the Bluetooth connection to the specific external device; and
- a controller configured to:
- receive an input request for attempting to establish the Bluetooth connection to the specific external device via the Bluetooth setting menu,
- control the short range communication module to search for the specific external device to attempt to establish the Bluetooth connection with the specific external device, and
- control the display unit to display indication information indicating a failure of the search for the specific external device if the search for the specific external device fails, wherein:
- the Bluetooth setting menu includes a list updated with other external devices successfully found by a previous search, and
- the controller is further configured to control the display unit to display the indication information on a top or bottom end line within the list.

18. The mobile terminal of claim 17, wherein the Bluetooth setting menu includes an allow device search option for turning on an allow device search feature in the specific external device.

19. The mobile terminal of claim 18, wherein the allow device search option is output only when the search for the specific external device fails.

20. The mobile terminal of claim 18, wherein the Bluetooth setting menu includes a search window for inputting information used to search for the specific external device, and the controller is further configured to display the allow device search option for turning on the allow device search feature in the specific external device before searching for the specific external device.

21. The mobile terminal of claim 18, wherein the controller is further configured to control the display unit to display the allow device search option as a popup window on the Bluetooth setting menu.

22. The mobile terminal of claim 18, wherein the controller is further configured to control the short range communication module to re-search for the specific external device when the allow device search option is selected.

23. The mobile terminal of claim 22, wherein, if the re-search finds the specific external device, the controller is further configured to update the list with the found specific external device and distinctively identify the found specific external device within the list.

24. The mobile terminal of claim 23, wherein the controller is further configured to distinctively identify the found specific external device by at least one of:
- changing a display style of the found specific external device to be different from that of the other external devices,
- displaying the found specific external device on a top or bottom end within the list, and
- displaying new information next to the found specific external device.

25. The mobile terminal of claim 18, further comprising:
- a wireless communication unit configured to wirelessly communicate with the specific external device using a communication protocol other than Bluetooth,
- wherein if the search for the specific external device fails, the controller is further configured to control the wireless communication unit to transmit a signal to the specific external device for turning on the allow device search feature using the communication protocol other than the Bluetooth.

26. The mobile terminal of claim 25, wherein the controller is further configured to receive information from the specific external device indicating that the allow device search feature is enabled in the specific external device via the wireless communication unit, and to control the display unit to display information requesting a user re-search for the specific external device.

27. The mobile terminal of claim 17, wherein the controller is further configured to control an audio output module to output an audio indicating the search for the specific external device has failed.

28. The mobile terminal of claim 17, wherein the controller is further configured to control the display unit to display the indication information as an indicator icon within an indicator region displayed on the display unit.

29. The mobile terminal of claim 17, wherein the controller is further configured to control the indication information to continuously be displayed on a corresponding line until the indication information is selected and confirmed.

30. The mobile terminal of claim 17, wherein the controller is further configured to control the display unit to display the indication information within a scroll bar region if the scroll bar displayed within the list is shifted.

31. A method of controlling a mobile terminal, the method comprising:
- displaying, via a display unit, a Bluetooth setting menu for establishing a Bluetooth connection to a specific external device;
- attempting, via a short range communication module, to establish the Bluetooth connection to the specific external device;
- receiving, via a controller, an input request for attempting to establish the Bluetooth connection to the specific external device via the Bluetooth setting menu;
- searching, via the short range communication module, for the specific external device to attempt to establish the Bluetooth connection with the specific external device; and
- displaying, via the display unit, indication information indicating a failure of the search for the specific external device if the search for the specific external device fails, wherein:
- the Bluetooth setting menu includes a list updated with other external devices successfully found by a previous search, and
- the indication information is displayed on a top or bottom line within the list.

* * * * *